(12) United States Patent
McKnight

(10) Patent No.: US 9,751,350 B2
(45) Date of Patent: Sep. 5, 2017

(54) SYSTEM AND METHOD FOR SCORING AND APPLYING A PIGMENT SOLUTION TO A SUBSTRATE

(71) Applicant: Thomas J. McKnight, Sewickley, PA (US)

(72) Inventor: Thomas J. McKnight, Sewickley, PA (US)

(*) Notice: Subject to any disclaimer, the term of this patent is extended or adjusted under 35 U.S.C. 154(b) by 224 days.

(21) Appl. No.: 14/211,356

(22) Filed: Mar. 14, 2014

(65) Prior Publication Data

US 2014/0263174 A1    Sep. 18, 2014

Related U.S. Application Data

(60) Provisional application No. 61/789,564, filed on Mar. 15, 2013.

(51) Int. Cl.
| | |
|---|---|
| C03C 15/00 | (2006.01) |
| B41M 5/00 | (2006.01) |
| B41C 1/14 | (2006.01) |
| C09K 3/14 | (2006.01) |
| B41J 3/407 | (2006.01) |
| B41J 11/00 | (2006.01) |
| B41M 7/00 | (2006.01) |

(52) U.S. Cl.
CPC ........... *B41M 5/0047* (2013.01); *B41C 1/147* (2013.01); *B41J 3/407* (2013.01); *B41J 11/002* (2013.01); *B41M 5/007* (2013.01); *B41M 5/0058* (2013.01); *B41M 5/0064* (2013.01); *B41M 7/0081* (2013.01); *C09K 3/1454* (2013.01)

(58) Field of Classification Search
CPC ... B41C 1/147; Y10S 438/948; C09K 3/1454; H05K 2203/0746; B41J 3/407
USPC ...................... 216/42, 48, 49, 50, 89, 92, 97
See application file for complete search history.

(56) References Cited

U.S. PATENT DOCUMENTS

| | | | |
|---|---|---|---|
| 6,346,315 B1 | 2/2002 | Sawatsky | |
| 6,699,352 B2 | 3/2004 | Sawatsky | |
| 2004/0185233 A1 | 9/2004 | Sawatsky | |
| 2006/0052473 A1* | 3/2006 | Takabayashi | .......... B41J 11/002 522/71 |
| 2007/0122723 A1* | 5/2007 | Hopper | ................ C09D 11/101 430/9 |
| 2007/0264454 A1* | 11/2007 | Uptergrove | ........ B65D 23/0807 428/36.8 |
| 2010/0039487 A1 | 2/2010 | Sawatsky | |
| 2011/0250405 A1 | 10/2011 | Sawatsky | |

(Continued)

*Primary Examiner* — Binh X Tran
(74) *Attorney, Agent, or Firm* — The Webb Law Firm

(57) ABSTRACT

A method for scoring and, optionally, for applying a pigment solution to a substrate is provided herein. The method includes the steps of: providing a substrate; applying a curable solution to the substrate with a digital ink jet printer; curing the applied curable solution to form a cured region; and applying a fluid for eroding the substrate to at least a portion of the substrate including the cured region. The fluid for eroding the substrate effectively removes portions of the substrate, which are not covered by the cured region, to form an eroded region of the substrate. In certain embodiments, a plurality of pigment solutions are then applied to at least a portion of the eroded region of the substrate with the digital ink-jet printer to form embellishments, decorative features, or designs in the eroded regions of the substrate.

12 Claims, 3 Drawing Sheets

(56) References Cited

U.S. PATENT DOCUMENTS

2013/0017388 A1* 1/2013 Boguslavsky ............ C03C 8/14
428/312.6

* cited by examiner

SYSTEM AND METHOD FOR SCORING AND APPLYING A PIGMENT SOLUTION TO A SUBSTRATE

CROSS REFERENCE TO RELATED APPLICATION

This application claims priority to U.S. Provisional Patent Application No. 61/789,564 filed on Mar. 15, 2013, which is hereby incorporated by reference in its entirety.

BACKGROUND OF THE INVENTION

Field of the Invention

The present invention relates to a method for scoring a substrate by, for example sandblasting, followed by applying a pigment solution to the substrate surface. More particularly, the invention relates to a method employing an ink-jet printing apparatus to apply substances to the substrate surface.

Description of Related Art

Numerous methods, systems, and devices are known for applying decorative or aesthetically pleasing features to three dimensional, curved surfaces, such an exterior surface of a product, article, or container. Applying a decorative feature such as a design or logo to a manufactured product or article may serve to increase the overall visual appeal of the product, to display information (e.g., slogans, awards and product details), to differentiate a product from competitors, and for branding and advertising purposes.

One simple method for applying a decorative feature to a three-dimensional curved surface is to affix an adhesive label or sticker directly to the surface. The label or sticker can be printed using traditional two-dimensional printing techniques, and then the sticker can be attached to the curved surface. Many disposable products such as cans, bottles, and the like are prepared in this manner. However, stickers or other adhesives are easily removed from the surface. For example, exposure to water, moisture, or heat may weaken the adhesive causing the sticker to fall off the product, article, or container.

Alternatively, decorative features may be printed on a curved surface by a screen printing process. Screen printing is a technique in which a screen is prepared by applying inks or pigment solutions to the screen to form an image. The image contained on the screen is transferred to the substrate by pressing the screen against the substrate. For certain inks or pigment solutions, the screen must be heated or exposed to some other curing agent or condition to cause the ink or pigment solution to affix to the substrate surface. Screen printing is more permanent than affixing a sticker or label to a substrate surface. However, screen printing techniques can be labor intensive and require processing steps including: separation of colors for multi-color designs, preparing the screen, and transferring the screens to the substrate. In addition, the screen may be incorrectly placed on the substrate, meaning that the image will not be aligned or oriented as desired.

Abrasive blasting and acid etching are alternative techniques for providing decorative features to a substrate. These techniques provide a decorative element often referred to as frosted glass. In sandblasting, a mask is placed over a substrate to protect certain portions of the substrate. The substrate is exposed to a stream of a hard particulate media, such as silica, sand, garnet, synthetic particles, or engineered abrasives (i.e., aluminum oxide, silicon carbide, or carborundum). The abrasive stream wears away the portion of the substrate that is not covered by the mask, thereby creating an image or design on the substrate surface. Similarly, in an acid etching process, an acid solution is applied to a substrate surface. The acid solution effectively wears away the portion of the substrate that is not protected by a mask layer.

For some products, the appearance of a sandblasted or acid etched substrate is further enhanced by adding color to the portions of the glass substrate that were worn away by sandblasting or etching. Addition of pigment or paint to the sandblasted or etched portions of the substrate causes the eroded regions to stand out, making these regions easier to view or read. Traditionally, color is added to sandblasted substrates by hand. However, applying pigment by hand to a substrate greatly increases costs of the decorated article. Accordingly, addition of color to a sandblasted article is generally only performed for high cost or custom made pieces. Such design options are not available for low-cost and disposable articles.

Accordingly, there is a need for a method for scoring and then applying pigment to a substrate. The method should permit mass production of articles. Furthermore, the method should apply pigments which are non-toxic, safe for human consumption, and dishwasher safe.

SUMMARY OF THE INVENTION

Generally provided are methods and systems for scoring a substrate surface and for applying a pigment solution to the substrate surface using a digital ink-jet printer. The present method and system address or overcome various deficiencies and drawbacks associated with existing methods for scoring a substrate surface, especially by providing a method which can be adapted for mass production and which is easily adapted to change between various patterns, designs, or images.

Accordingly, and in one preferred and non-limiting embodiment, a method for scoring a substrate includes the steps of: providing a substrate; applying a curable solution to the substrate with a digital ink jet printer; curing the applied curable solution to form a cured region; and applying a fluid for eroding the substrate to at least a portion of the substrate including the cured region. The fluid for eroding the substrate effectively removes portions of the substrate, which are not covered by the cured region, to form an eroded region of the substrate. In certain embodiments, a plurality of pigment solutions are then applied to at least a portion of the eroded region of the substrate with the digital ink jet printer to form embellishments, decorative features, or designs in the eroded regions.

In certain embodiments of the method, the substrate is formed from one or more of the following materials: glass, plastic, metal, or ceramic. Further, the substrate may be a three-dimensional curved surface. Additionally, the substrate may be integrally formed with a manufactured product, including dinnerware, kitchen utensils, drinkware, serverware, lamp shades, coasters, plaques, name tags, timepiece faces, bottles, or cans. In addition, the curable solution may be an ink which is cured by exposure to ultraviolet light. The step of curing the applied substance may include exposing the ink to ultraviolet light.

In certain further embodiments, the step of applying a fluid for eroding the substrate includes the step of applying a fluid mixture containing an abrasive agent to the substrate as a pressurized stream. Optionally, the abrasive agent may include at least one of the following: silica sand, garnet, hard synthetic particles, aluminum oxide, silicon carbide, or carborundum. Alternatively, the fluid for eroding the substrate may be an acid.

In certain further embodiments, the step of applying a pigment solution to at least a portion of the eroded region includes the step of applying a curable solution to the eroded area by digital ink-jet printing. More particularly, the step of applying a pigment solution by ink-jet printing includes applying a base layer with the ink-jet printer followed by separately applying one or more pigment layers on top of a portion of the base layer. Optionally, the pigment layers include one or more of a cyan layer, a magenta layer, a yellow layer, or a black layer. The pigment substance may be an ink which is cured by exposure to ultraviolet light. The method may further include the step of curing the substrate after each pigment layer is applied.

According to a further aspect of the invention, a system for scoring and applying a pigment substance to a substrate is provided herein. The system includes: a controller unit including a microprocessor for analyzing a digital image to be printed to a substrate; an ink-jet printer associated with the controller unit and including a plurality of printheads for applying a curable solution to a substrate in a pattern directed by the controller unit and based on the digital image; a radiation generator, associated with the controller unit, for applying radiation to the substrate to cure the solution; and a fluid pressurizer, also associated with the controller unit, for providing a pressurized fluid stream including an abrasive agent to the substrate. It is noted that the curable solution that is applied to the substrate by the ink-jet printer does not erode when exposed to the pressurized fluid stream. However, portions of the substrate not covered by the curable solution are eroded to form an eroded region of the substrate layer.

In certain embodiments, after the substrate is exposed to the fluid stream, the ink-jet printer, being directed by the controller unit, is configured to provide a base layer of a curable solution to at least a portion of the eroded layer of the substrate. The printer then separately applies a plurality of additional pigment layers on top of portions of the base layer. The additional layers may include a cyan layer, a magenta layer, a yellow layer, or a black layer. Additionally, the radiation generator may be configured to apply radiation to the substrate after the base layer is applied to the substrate and again after each of the additional pigment layers are applied to the substrate.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

BRIEF DESCRIPTION OF THE DRAWINGS

For the purpose of facilitating understanding of the invention, the accompanying drawings and description illustrate preferred embodiments thereof, from which the invention, various embodiments of its structures, construction and method of operation, and many advantages may be understood and appreciated.

DESCRIPTION OF THE PREFERRED EMBODIMENTS

For purposes of the description hereinafter, it is to be understood that the invention may assume alternative variations and step sequences, except where expressly specified to the contrary. It is also to be understood that the specific devices, systems, and processes described in the attached drawings, and described in the following specification, are simply exemplary embodiments of the invention. Hence, specific physical characteristics of devices, materials, substances, and chemicals related to the embodiments disclosed herein are not to be considered as limiting.

Figure 3A:
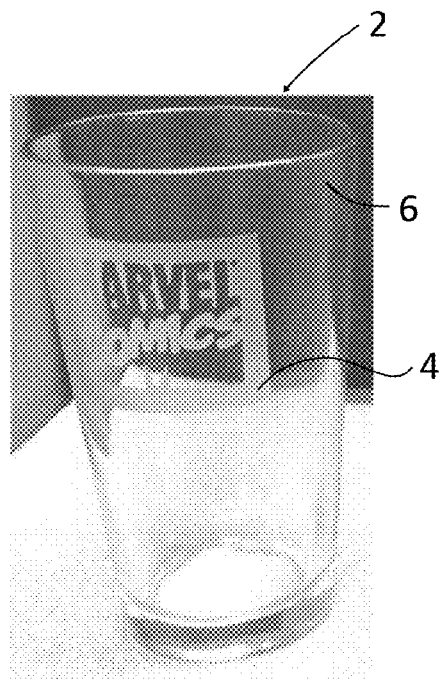
FIG. 3A is a photographic depiction of a glass substrate that has been scored according to the method of FIG. 2.

The present invention is directed to a system and method for providing a decorative or aesthetically pleasing designs, images, logos, or finishes to a substrate 2. An exemplary substrate 2 is depicted in FIG. 3A. The substrate 2 is formed from a material having a sufficient hardness and thickness that it can be scored, etched, or carved without shattering or breaking. Exemplary materials include glass, plastic, ceramics, or metal. The substrate may be transparent, translucent, or opaque. In certain embodiments, the substrate includes, or is integrally formed with, any of a variety of manufactured products, including dinnerware, kitchen utensils, drinkware, serverware, coasters, plaques, name tags, timepiece faces, bottles, or cans.

Figure 1:
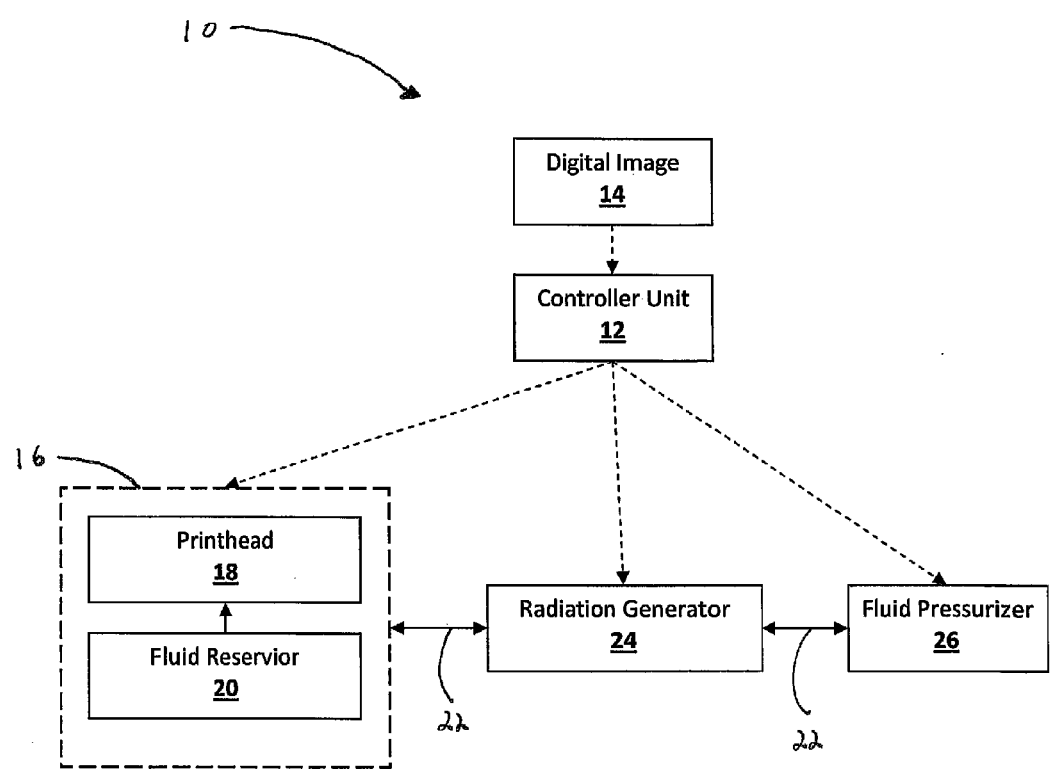
FIG. 1 is a schematic drawing of a system for scoring and applying a pigment substance to a substrate, according to an embodiment of the invention.

The decorative finish includes eroded or scored regions 4 cut into the substrate surface 6. The eroded or scored regions 4 may be further embellished with decorative pigments or paints 8. With reference to FIG. 1, a system 10 for scoring and applying a pigment solution to a substrate 2 includes a controller unit 12, such as a computer, computer network, microprocessor, or similar arrangement of electronic processing elements. In one non-limiting embodiment, the controller unit 12 is configured to obtain a pattern, design, or logo to be printed to a substrate 2 as a digital image 14. The digital image 14 may be provided on any known or subsequently adopted file format, including bitmat (.bmp), .jpeg, .gif, or others. The controller unit 12 converts the digital image 14 into a series of instructions for controlling function of an ink-jet printer 16. It is noted that the digital image 14 provided to the controller unit 12 and printed on the substrate 2 can be easily modified without making any further adjustments to the ink-jet printer 16 or other components of the system 10. More particularly, a user is not be required to rearrange the printer 16, alter the position of conveyor belts 22 connecting various components of the system 10 to one another, or make any similar adjustments to the system 10 to prepare to print a new image. Instead, the controller unit 12 and ink-jet printer 16 are configured to print different patterns and designs merely by providing a new digital image 14 to the controller unit 12.

With continued reference to FIG. 1, the ink-jet printer 16 includes a plurality of printheads 18 connected to a plurality of fluid reservoirs 20 containing a curable solution to be applied to the substrate 2. The printheads 18 are attached to a moving mechanism configured to move across the three-dimensional substrate surface 6 in a predetermined pattern and to dispense fluid from the reservoir 20 to the substrate surface 6 through a fluid nozzle (not shown). A suitable ink jet printer 16 and method of use for providing a curable solution to a three-dimensional object is disclosed in U.S. Pat. No. 6,699,352 entitled "Decorative and Protective System for Wares", U.S. Patent Publication No. 2010/0039487 entitled "Digital Ink-jet Printer and Process", and U.S. 2011/0250405 entitled "Decorative and Protective System for Wares", the named inventor of which is Hank Sawatsky, and the disclosure of each of which are incorporated by reference in their entireties.

The curable solution is a flowable material which becomes immovable once it contacts the substrate surface 6. In certain embodiments, the solution is further cured or hardened by exposing the substance to a suitable curing agent or condition. For example, the solution may be cured by exposing the substance to a radiation beam, such as ultraviolet light. The radiation beam may be provided by a radiation generator 24, such as a UV lamp or bulb. One exemplary material suitable for use with the above-described ink-jet printing process is HexiLok™ ink developed by Hexion Specialty Chemicals Inc. of Cincinnati, Ohio. HexiLok™ inks are a two component system. The first component is cured by infrared or conventional heat. The second component is cured by exposure to ultraviolet light. In this initial application of the curable solution, the color of the ink or other fluid substance is not particularly important. Therefore, a curable solution of any color or a transparent solution may be used. However, regardless of the color used, the solution, once cured, should have sufficient hardness to withstand various processing steps, including application of abrasive substances to the substrate surface 6.

From the radiation generator 24, the cured substrate 2 passes to a fluid pressurizer 26 for providing a pressurized abrasive fluid, such as a stream of abrasive particles or a chemically abrasive solution, such as hydrochloric acid, to the substrate surface 6. It is noted that the transfer of the substrate 2, from the ink-jet printer 16, to the radiation generator 24, to the fluid pressurizer 26 may be a manual transfer, where a user carries the substrate 2 from one machine to another. Alternatively, the substrate 2 may be transferred by an automated mechanism, such as a series of conveyer belts 18, picking and placing apparatus, or other transferring apparatus, as are known in the art.

With continued reference to FIG. 1, in one non-limiting embodiment, the fluid pressurizer 26 is configured to provide a treatment for eroding a portion of the substrate surface 6, generally referred to as a "sandblasting" treatment. In the sandblasting treatment, the abrasive fluid includes solid particulate, such as silica, sand, garnet, hard synthetic particles, or engineered abrasive particles, such as aluminum oxide, silicon carbide, or carborundum. The fluid containing the abrasive particles is pressurized and sprayed toward the cured substrate surface 6. The portions of the substrate surface 6 covered by the cured solution are protected from the abrasive stream. However, regions which are not protected are worn away forming channels, depressions, or scored regions, on the substrate surface 6. Alternatively, the substrate surface 6 may be treated by an acid etching process in which a strong acid (e.g., hydrochloric acid) is exposed to the substrate surface 6. In this case, a chemical reaction between the substrate surface 6 and acid solution erodes the substrate surface 6 to create the eroded region.

After the cured substrate 2 is exposed to the abrasive fluid from the fluid pressurizer 26, the substrate may be passed to a machine or device (not shown) for removing the cured solution from the substrate surface 6. For example, the substrate 2 may be heated, using a kiln, furnace, exposed burner, or other known heating apparatus, to sufficient temperature to dissolve, burn, or otherwise detach the cured solution from the substrate surface 6. Alternatively, other techniques for removing the cured solution may also be employed, including exposing the substrate surface 6 to a wash solution for dissolving the cured solution or using mechanical means such as scraping to remove the cured solution from the substrate surface 6. The technique used to remove the cured solution is determined based on the characteristics of the curable solution being used.

With continued reference to FIG. 1, the ink-jet printer 16 may also be used to apply colored embellishments to the eroded regions of the substrate surface 6. It is noted that one problem with using ink-jet printing technology to apply color to a three dimensional surface, such as a glass, plastic, ceramic, or metal substrate, is that pigment solutions or inks generally splatter when applied to the substrate surface. Therefore, in the present invention, the pigment solutions or inks are applied to the substrate surface separately. As described above, in one preferred and non-limiting embodiment, the pigment solutions are HeliLox™ inks. HeliLox™ inks are available in white, cyan, magenta, yellow, and black. The ink-jet printer 16 is configured to first apply a white base or background layer to the portions of the eroded region, which will receive colored embellishments or decorations. The white layer is applied to the entire area to be printed and serves as a base and adhesive surface for other ink layers, which are apply separately and over top of the base white layer. After the white ink is applied, the substrate is cured by exposing the substrate surface 6 to ultraviolet light provided by the radiation generator 24. Curing the substrate surface 6 each time that ink is applied ensures that the ink will not drip or wear away during subsequent ink application and curing steps. After the white ink is applied and cured, layers of the remaining inks are applied separately as directed by the controller unit 12. The substrate is cured after each layer is applied to prevent the applied pigment solution from dripping, running, or mixing with previously applied layers.

The ink-jet printer 16 may also be configured to provide a final protective coating layer to the entire portion of the substrate surface 6, which has received the pigment solutions. The protective coating layer is provided to prevent the pigment layers from wearing away following prolonged use. The protective layer may also prevent the pigment layers from leaching to various foods, solutions, or substances, which would make the substrate unsafe for certain uses (e.g., cookware, dinnerware, food storage, etc.). Additionally, the protective coating layer may make the substrate dishwasher safe. The protective coating layer may be applied to the substrate surface by a known application method such as spray coating, submerging in a solution bath, or by printing the protective coating layer directly on top of the pigment layers using the ink-jet printer, according to the above-described process.

Figure 2:
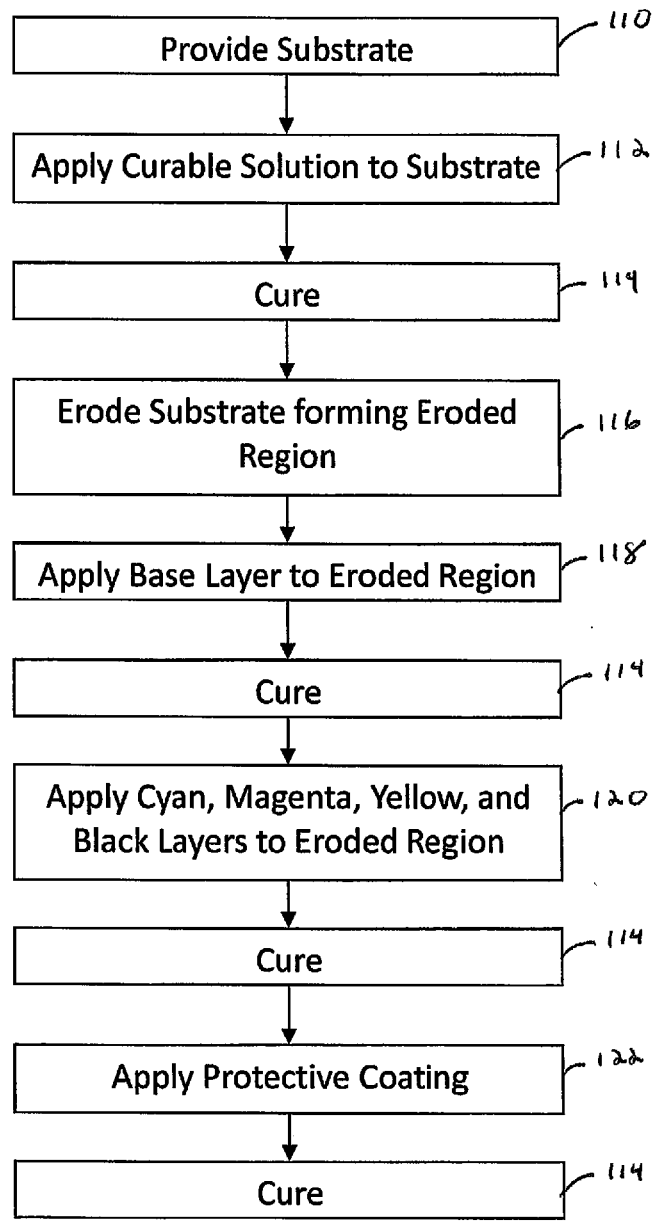
FIG. 2 is a flow chart depicting steps for scoring and applying a pigment substance to a substrate, according to an embodiment of the invention.

Having described various elements of a system 10 for scoring and applying a pigment substance to a substrate, a method for performing these activities will now be described. With reference to FIG. 2, the method includes the step of providing a suitable substrate 110. As described above, the substrate must be formed from a hard material, which can be exposed to various treatments including heat, abrasive fluids, and mechanical printing apparatus without cracking, chipping, or breaking. The material also must be sufficiently textured so that fluid substances, such as ink, can affix to the substrate without dripping.

The method further includes the step of applying a curable solution to the substrate 112. More specifically, a pattern, design, logo, or similar decorative element is printed onto the substrate using an ink-jet printer. The printer is controlled by a controller unit, which instructs the printer to deposit a fluid substance, such as curable ink, to the substrate surface to form a predetermined image. Once the curable ink is applied, the substrate is cured 114 by exposing the substrate to a beam of appropriate radiation provided by an ultraviolet lamp or bulb.

The cured substrate is then passed to the fluid pressurizer, where a stream of pressurized fluid is applied to the substrate. As described above, the pressurized fluid erodes unprotected portions of the substrate 116 creating grooves, channels, indentations, and the like on the substrate surface. The pressurized fluid may be an abrasive fluid including a solvent mixed with solid particulate particles. Alternatively, the substrate may be treated by an etching process, such as acid etching. In that case, the substrate is exposed to an acid, such as hydrochloric acid, for eroding portions of the substrate.

After the substrate is etched, sandblasted, or eroded using another known process, the cured solution may be removed from the substrate surface. In certain embodiments, the cured solution may be removed by heating the substrate to a predetermined temperature which is sufficient to dissolve, burn, or otherwise detach the cured solution from the substrate surface. As described above, other techniques for removing the cured solution may also be employed within the scope of the invention, and are determined based on the type of curable solution being used. A photographic depiction of a glass substrate scored according to the above described method is provided in FIG. 3A.

After the cured solution is removed from the substrate surface, the substrate is returned to the ink-jet printer for applying colored embellishments to the eroded regions. As was described previously, the process of applying colored embellishments to an eroded region of a substrate surface was previously done by hand. Such a manual process was time consuming, expensive, and meant that such embellishments could not be provided in a mass production process.

Figure 3B:
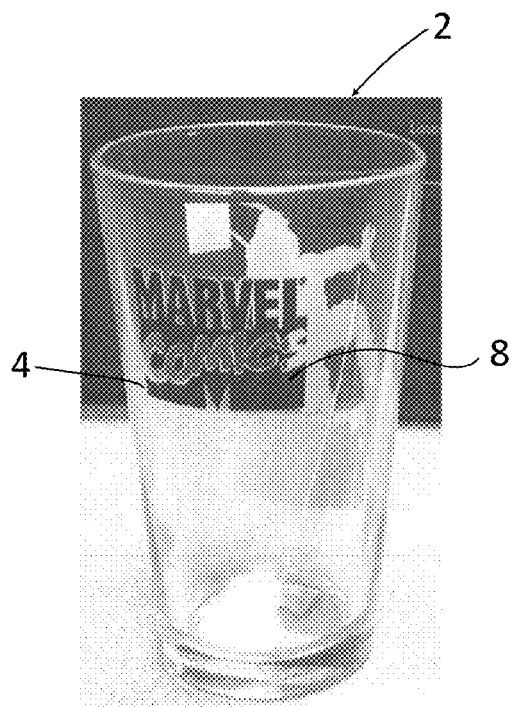
FIG. 3B is a photographic depiction of the glass substrate of FIG. 3A, wherein the scored portion has been decorated with a pigment solution.

In the presently invented method, the ink-jet printer begins by applying a base layer to portions of the eroded region, which are intended to receive color 118. As described above, the ink-jet printer is directed by the controller unit which controls movement of the printheads and dispersion of the fluid ink therefrom, based on a digital image provided to the controller. Once the white or base layer is provided to the entire region which is intended to receive color, the white or base layer is cured. The curing step ensures that the layer will not drip or be worn away by subsequent treating steps. After the base layer is applied, additional layers of ink are separately applied to the substrate surface 120, as directed by the controller unit. For example, a cyan layer may be applied, followed by a curing action to prevent the cyan layer from dripping or wearing away. Subsequently, magenta, yellow, and black layers are applied and cured to produce the predetermined colored image. The deposition of the base layer and pigment layers may be directed by the controller unit 12, or similar electronic systems, as are known in the art. After all pigment solutions are applied to the substrate surface, a protective coating layer may be applied to the substrate surface 122. A photographic depiction of a glass substrate with the scored portion printed with the pigment solution is provided in FIG. 3B.

While specific embodiments of the invented system and method have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

The invention claimed is:

1. A method for scoring a curved surface of a manufactured product, the method comprising:
   providing the manufactured product;
   under control of a system controller, moving a print-head of a digital ink-jet printer which is connected to a plurality of fluid reservoirs over the curved surface of the manufactured product according to a predetermined pattern to apply a curable solution contained in a first reservoir of the plurality of fluid reservoirs to a portion of the curved surface of the manufactured product;
   curing the applied curable solution to form a cured region;
   applying a fluid for eroding the curved surface of the manufactured product to at least a portion of the curved surface including the cured region, thereby removing portions of the manufactured product, which are not covered by the cured region, to form an eroded region on the curved surface of the manufactured product;
   following formation of the eroded region, moving the print-head over the curved surface of the manufactured product according to the predetermined pattern as directed by the system controller to apply a pigment solution from a second reservoir of the plurality of fluid reservoirs on at least a portion of the eroded region of the curved surface of the manufactured product;
   curing the applied pigment solution from the second reservoir to form a base layer of a first color on at least a portion of the eroded region;
   following formation of the base layer, moving the print-head over the curved surface according to the predetermined pattern as directed by the system controller to apply a pigment solution from a third fluid reservoir of the plurality of fluid reservoirs to at least a portion of the base layer; and
   curing the applied pigment solution from the third fluid reservoir to form a pigment layer of a second color over the base layer,
   wherein the first color is different from the second color.

2. The method of claim 1, wherein the manufactured product is formed from one or more of the following materials: glass, plastic, metal, or ceramic.

3. The method of claim 1, wherein the curved surface is a three-dimensional curved surface.

4. The method of claim 1, wherein the manufactured product comprises one or more of: dinnerware, kitchen utensils, drinkware, serverware, coasters, plaques, name tags, timepiece faces, bottles, containers, and cans.

5. The method of claim 1, wherein the curable solution is an ink which is cured by exposure to ultraviolet light, and wherein the step of curing the applied curable solution comprises exposing the ink to ultraviolet light.

6. The method of claim 1, wherein the fluid for eroding the portions of the manufactured product is an acid.

7. The method of claim 1, further comprising removing the cured region from the curved surface of the manufactured product after the step of applying a fluid for eroding the curved surface is performed.

8. The method of claim 1, wherein the step of applying a fluid for eroding the portions of the manufactured product comprises applying a fluid mixture containing an abrasive agent to the curved surface of the manufactured product as a pressurized stream.

9. The method of claim 8, wherein the abrasive agent comprises at least one of the following: silica, sand, garnet, hard synthetic particles, aluminum oxide, silicon carbide, or carborundum.

10. The method of claim 1, further comprising following formation of the pigment layer, applying a pigment solution contained in a fourth fluid reservoir of the print-head to the article, thereby forming a second pigment layer of a third color which is different from the first color and the second color on at least a portion of the eroded region of the manufactured product.

11. The method of claim 10, wherein the pigment solutions contained in the third fluid and/or the fourth fluid reservoir comprise one or more of a cyan pigment, a magenta pigment, a yellow pigment, and a black pigment.

12. The method of claim 10, wherein the pigment solutions contained in the third fluid and/or the fourth fluid reservoir are cured by exposure to ultraviolet light.

* * * * *